United States Patent
Thubert et al.

(10) Patent No.: US 10,349,335 B2
(45) Date of Patent: Jul. 9, 2019

(54) METHODS AND APPARATUS FOR USE IN SELECTING A CONNECTION PATH FOR LOW-LATENCY, DETERMINISTIC MULTI-HOP D2D COMMUNICATIONS

(71) Applicant: Cisco Technology, Inc., San Jose, CA (US)

(72) Inventors: Pascal Thubert, La Colle sur Loup (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/795,637

(22) Filed: Oct. 27, 2017

(65) Prior Publication Data
US 2019/0132784 A1 May 2, 2019

(51) Int. Cl.
*H04W 40/22* (2009.01)
*H04W 40/12* (2009.01)
(Continued)

(52) U.S. Cl.
CPC .............. *H04W 40/22* (2013.01); *H04L 45/50* (2013.01); *H04W 40/12* (2013.01);
(Continued)

(58) Field of Classification Search
CPC ... H04W 40/22; H04W 40/12; H04W 40/246; H04W 56/001; H04W 72/0426;
(Continued)

(56) References Cited

U.S. PATENT DOCUMENTS 6,307,843 B1 * 10/2001 Okanoue ................. H04L 45/02
370/312
6,775,258 B1 * 8/2004 van Valkenburg ...... H04L 45/00
370/338
(Continued)

FOREIGN PATENT DOCUMENTS

WO 2017074486 A1 5/2017

OTHER PUBLICATIONS

Fodor et al., "Design Aspects of Network Assisted Device-to-Device Communications", IEEE Communications Magazine, pp. 170-177, Mar. 2012.
(Continued)

*Primary Examiner* — Mong-Thuy T Tran
(74) *Attorney, Agent, or Firm* — Patterson + Sheridan, LLP

(57) ABSTRACT

In one illustrative example, one or more controllers may be configured to perform a path selection procedure for selecting a connection path for multi-hop device-to-device (D2D) communications. Identifiers of candidate D2D device pairings from D2D peer discovery performed by a plurality of UEs served in a plurality of base stations and link quality data associated with each candidate D2D device pairings are obtained. D2D network topology map data including a plurality of link-state relationships are generated based on the identifiers of candidate D2D device pairings. A plurality of connection paths of UEs are computed based on the generated link-state relationships and the link quality data, where each computed connection path includes UEs indicated as required nodes and at least one UE indicated as a candidate relay node. An optimal connection path that satisfies a latency parameter is selected from the plurality of computed connection paths (e.g. based on a shortest path first or SPF algorithm). The selected connection path may be
(Continued)

part of an operational control loop for low latency, deterministic D2D communications.

20 Claims, 20 Drawing Sheets

(51) Int. Cl.
 *H04W 40/24* (2009.01)
 *H04W 56/00* (2009.01)
 *H04W 72/04* (2009.01)
 *H04L 12/723* (2013.01)
 *H04W 84/10* (2009.01)
 *H04W 84/18* (2009.01)
 *H04W 88/04* (2009.01)
 *H04W 92/18* (2009.01)

(52) U.S. Cl.
 CPC ....... *H04W 40/246* (2013.01); *H04W 56/001* (2013.01); *H04W 72/044* (2013.01); *H04W 72/0426* (2013.01); *H04W 84/105* (2013.01); *H04W 84/18* (2013.01); *H04W 88/04* (2013.01); *H04W 92/18* (2013.01)

(58) Field of Classification Search
 CPC . H04W 72/044; H04W 84/105; H04W 84/18; H04W 84/04; H04W 92/18; H04L 45/50
 USPC .................................................. 370/328, 329
 See application file for complete search history.

(56) References Cited

U.S. PATENT DOCUMENTS

| | | | |
|---|---|---|---|
| 8,705,527 B1* | 4/2014 | Addepalli | H04W 4/046 370/389 |
| 8,855,645 B2 | 10/2014 | Bienas et al. | |
| 9,503,242 B2 | 11/2016 | Rastogi | |
| 9,510,322 B2 | 11/2016 | Doppler | |
| 9,648,651 B2 | 5/2017 | Edge | |
| 2010/0142421 A1* | 6/2010 | Schlicht | H04W 4/20 370/310 |
| 2013/0287012 A1* | 10/2013 | Pragada | H04W 76/25 370/338 |
| 2015/0023325 A1* | 1/2015 | Wetterwald | H04L 5/0055 370/336 |
| 2015/0036495 A1 | 2/2015 | Venkatachalam et al. | |
| 2015/0043385 A1* | 2/2015 | Noh | H04W 24/02 370/255 |
| 2015/0126188 A1 | 5/2015 | Lindoff et al. | |
| 2016/0006837 A1* | 1/2016 | Reynolds | H04W 84/18 709/203 |
| 2016/0212682 A1* | 7/2016 | Chung | H04W 76/14 |
| 2016/0295627 A1* | 10/2016 | Karout | H04B 17/309 |
| 2016/0308793 A1* | 10/2016 | Levy-Abegnoli | H04L 45/16 |
| 2017/0019904 A1 | 1/2017 | Krishnamoorthy et al. | |
| 2017/0126338 A1* | 5/2017 | Zaidi | H04W 8/005 |
| 2017/0238346 A1* | 8/2017 | Egner | H04W 4/029 370/338 |
| 2017/0280489 A1 | 9/2017 | Zhang et al. | |
| 2017/0339510 A1* | 11/2017 | Condeixa | H04W 4/70 |
| 2018/0184231 A1* | 6/2018 | Egner | H04W 4/06 |
| 2018/0184330 A1* | 6/2018 | Egner | H04L 43/065 |

OTHER PUBLICATIONS

Kim et al., "3GPP SA2 Architecture and Functions for 5G Mobile Communication System", Science Direct, the Korean Institute of Communications and Information Sciences, ICT Express 3, (2017), pp. 1-8.

Naslcheraghi et al., "A Novel Device-to-Device Discovery Scheme for Underlay Cellular Networks", 25th Iranaian Conference on Electrical Engineering (ICEE2017), pp. 1-5.

Thubert, "An Architecture for IPv6 over the TSCH Mode of IEEE 802.15.4 Draft-Ietf-6tisch-Architecture-12", Internet-Draft, Cisco, pp. 1-53, Aug. 10, 2017.

* cited by examiner

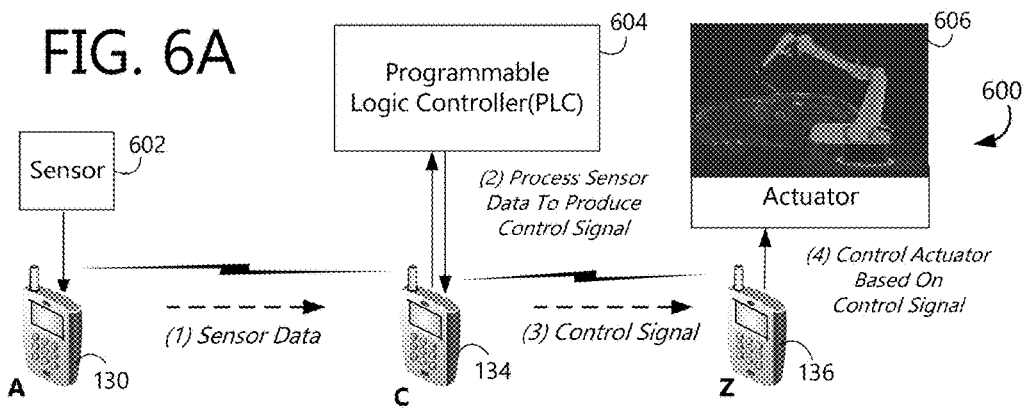
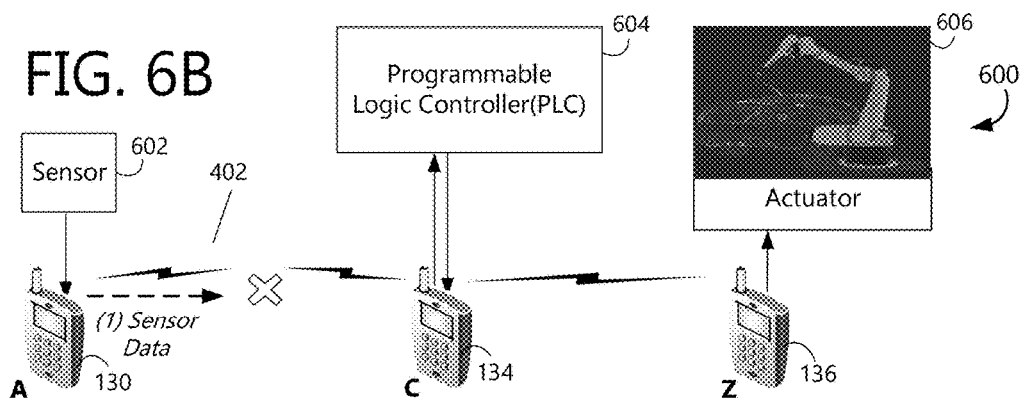
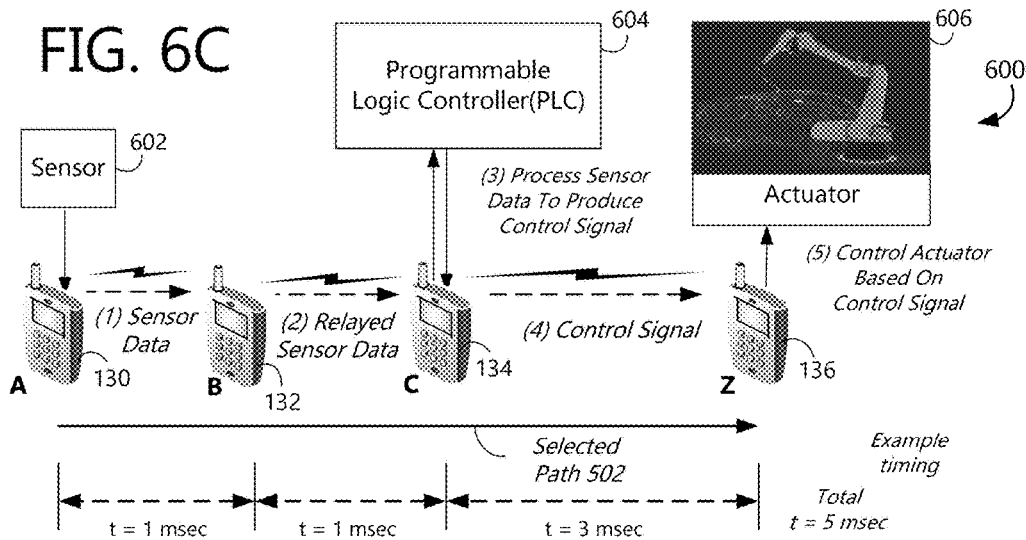

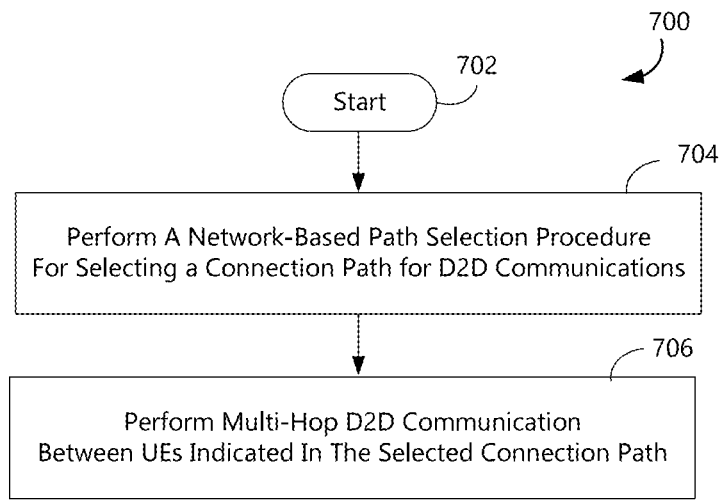
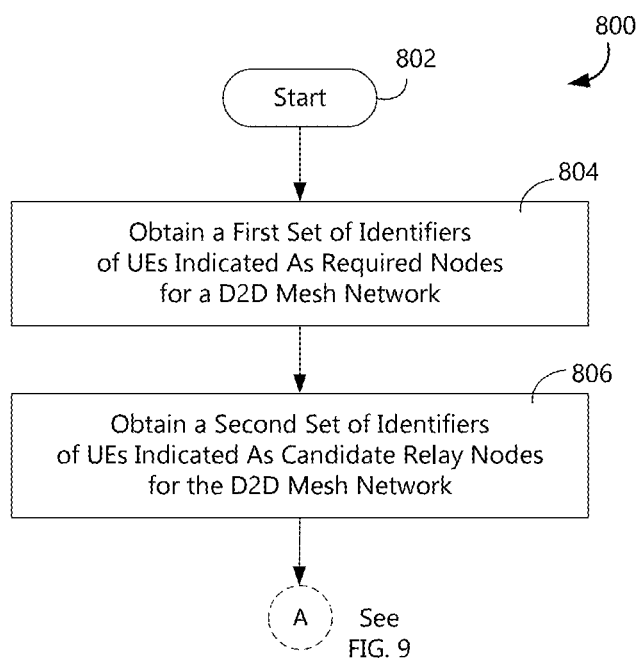

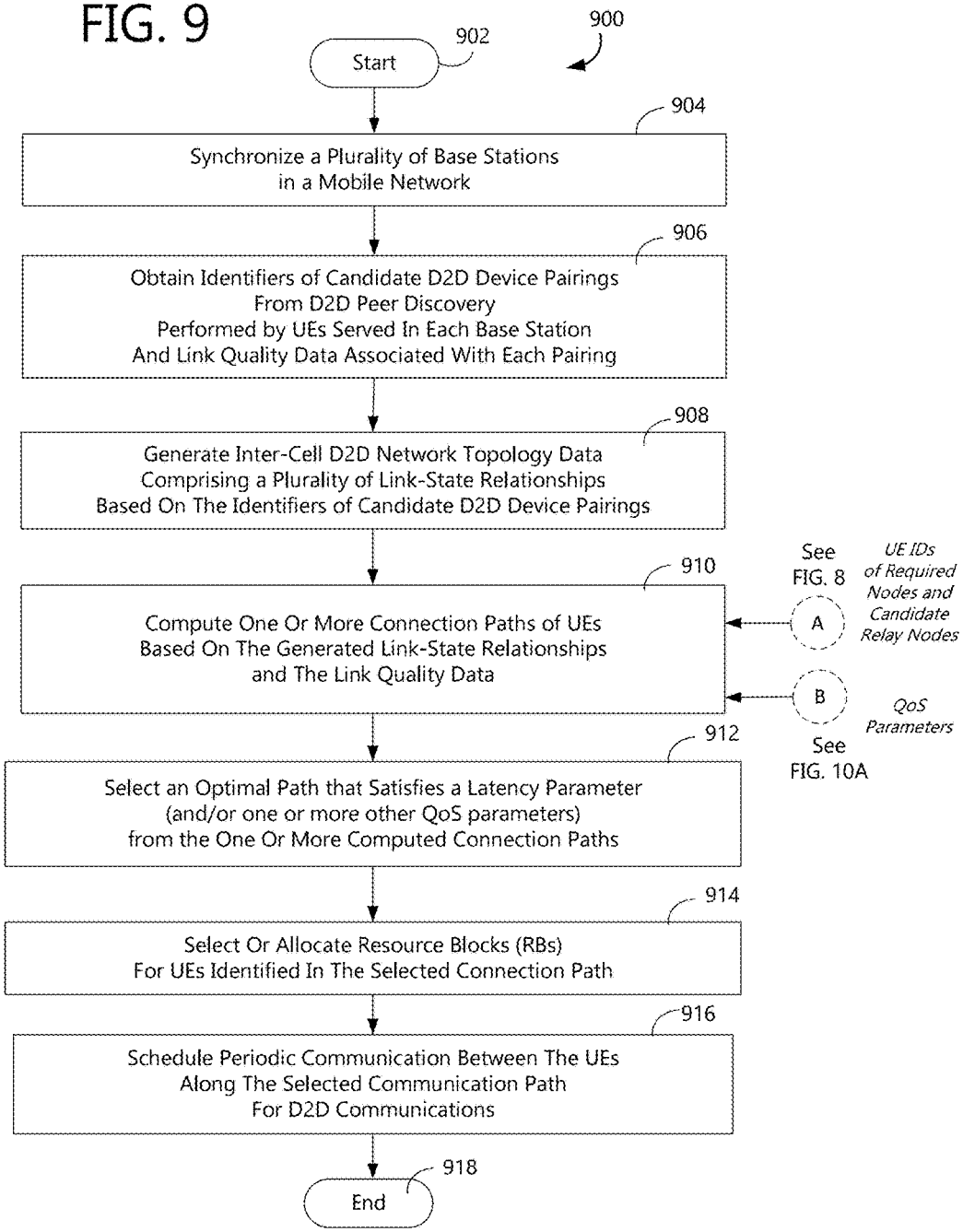

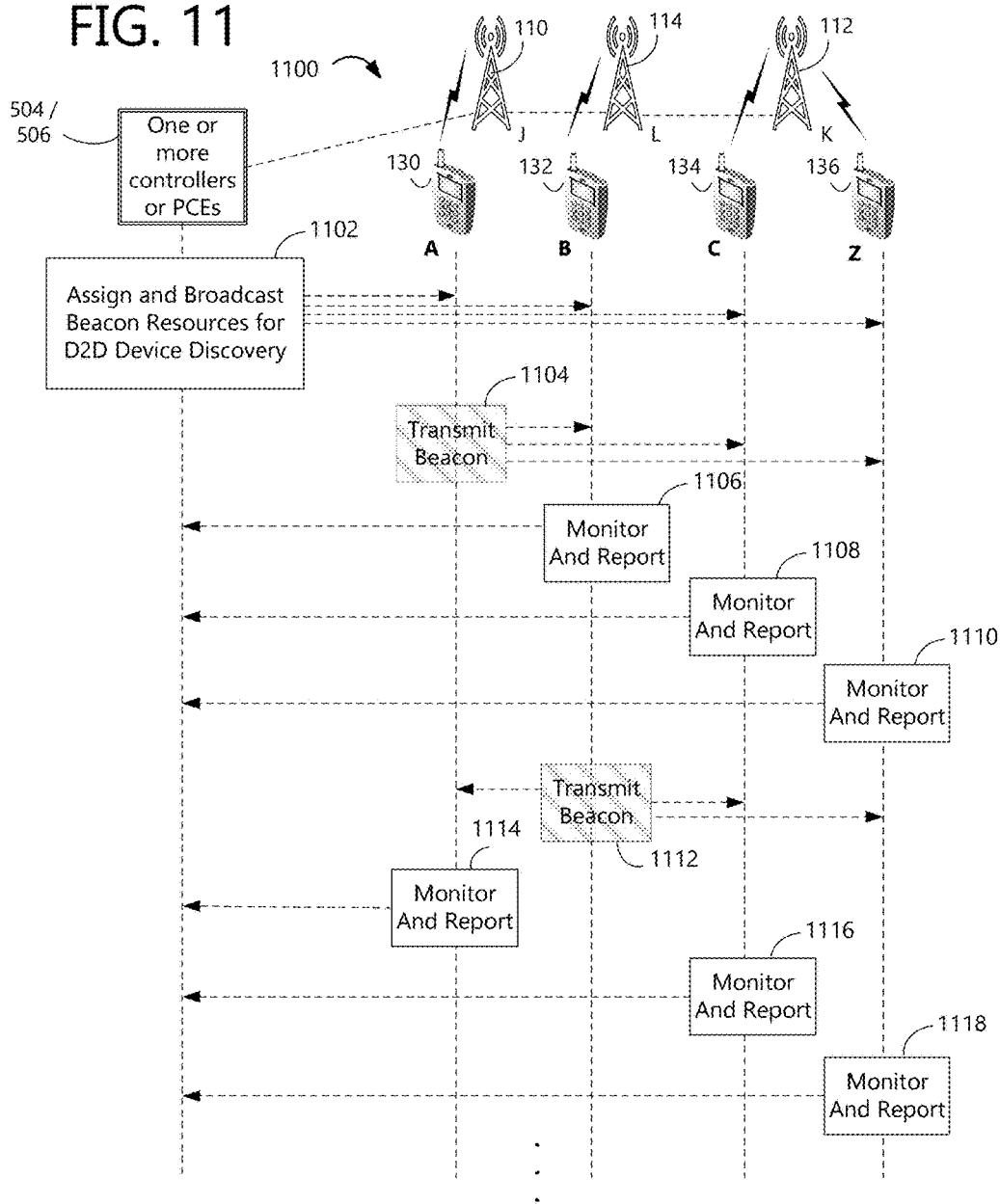

*Graphical / Pictorial Representation of
A Generated D2D Network Topology Map
Which Includes A Plurality Of Candidate Device-Link Relationships*

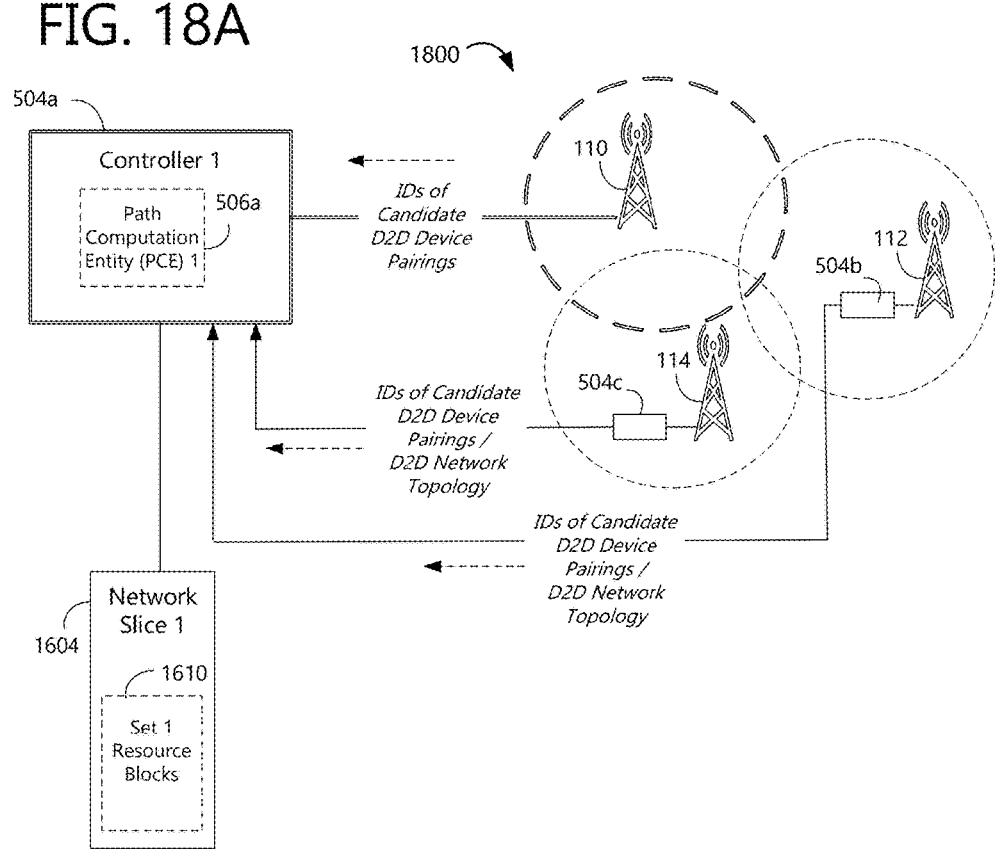

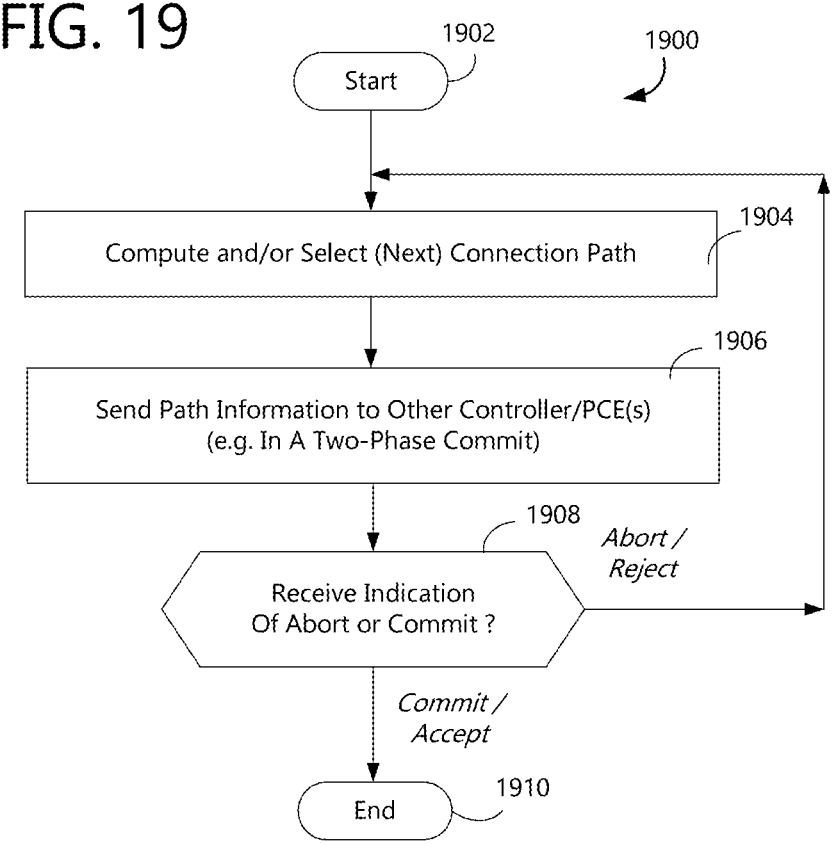

METHODS AND APPARATUS FOR USE IN SELECTING A CONNECTION PATH FOR LOW-LATENCY, DETERMINISTIC MULTI-HOP D2D COMMUNICATIONS

TECHNICAL FIELD

The present disclosure relates generally to methods and apparatus for use in selecting a connection path for multi-hop device-to-device (D2D) communications, and more particularly for selecting a connection path for low latency, deterministic multi-hop D2D communications, especially suitable for industrial applications.

BACKGROUND

There is a need to provide low latency, deterministic wireless communications with user equipment (UE) in a mobile network, especially for industrial applications (e.g. factory, manufacturing, processing, or other type of applications).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6A, 6B, and 6C are basic diagrams of a circuit, system, or operational control loop which may be established over a selected connection path of a D2D mesh network according to some implementations of the present disclosure;

FIG. 7 is a flowchart for describing a general method for use in providing D2D communications over a selected connection path according to some implementations of the present disclosure;

FIG. 8 is a flowchart for describing a method for use in selecting a connection path for multi-hop D2D communications according to some implementations of the present disclosure for use in combination with the method of FIG. 9;

FIG. 9 is a flowchart for describing a method for use selecting a connection path for D2D communications which may be performed by one or more controllers or one or more path computation entities (PCEs) according to some implementations of the present disclosure;

FIG. 11 is a message flow diagram for describing D2D peer discovery according to some implementations, which may be used in the method of FIG. 9;

FIG. 18A is an illustrative diagram of one of the controllers/PCEs of FIG. 17 operating in cooperation with other controllers/PCEs according to some implementations;

FIG. 19 is a flowchart of a method for use in selecting a connection path with use of the controller configuration of FIGS. 17-18.

Figure 1:
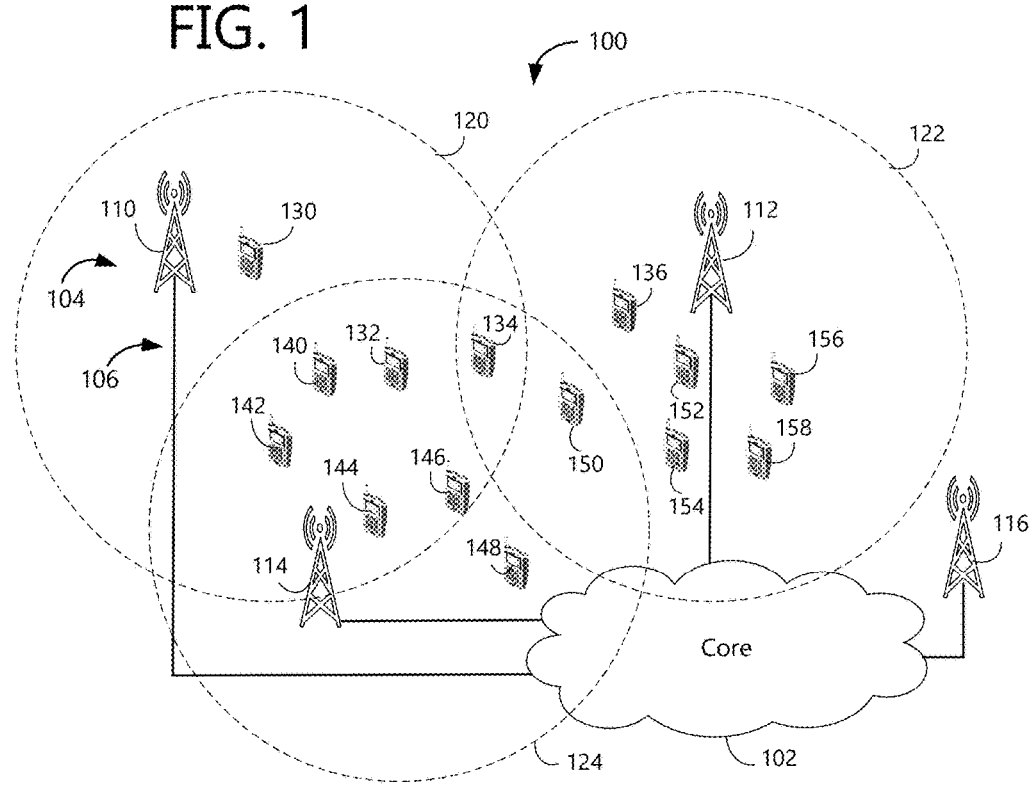
FIG. 1 is an illustrative diagram of a mobile network including a core network, a plurality of base stations connected to the core network, and a plurality of user equipment (UEs) operating in the mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in providing low latency, deterministic multi-hop device-to-device (D2D) communications are described herein. The methods and apparatus of the present disclosure may be especially suitable for use in industrial applications.

In one illustrative example, one or more controllers may be configured to perform a path selection procedure for selecting a connection path for multi-hop D2D communications. Identifiers of candidate D2D device pairings from D2D peer discovery performed by a plurality of UEs served in a plurality of base stations and link quality data associated with each candidate D2D device pairings are obtained. D2D network topology map data including a plurality of link-state relationships are generated based on the identifiers of candidate D2D device pairings. A plurality of connection paths of UEs are computed based on the generated link-state relationships and the link quality data, where each computed connection path includes UEs indicated as required nodes and at least one UE indicated as a candidate relay node. An optimal connection path that satisfies a latency parameter is selected from the plurality of computed connection paths (e.g. based on a shortest path first or SPF algorithm). The selected connection path may be part of an operational control loop for low latency, deterministic D2D communications.

Example Embodiments

FIG. 1 is an illustrative diagram of a mobile network 100 which may incorporate techniques of the present disclosure. Mobile network 100 is shown to include a core network, 102 a plurality of base stations 104 (e.g. base stations 110, 112, and 116) connected to the core network 102, and a plurality of user equipments (UEs) 106 operating in the mobile network 100.

In the example of FIG. 1, the UEs 106 include many UEs, such as UEs 130, 132, 134, 136, 140, 142, 144, 146, 148, 150, 152, 154, 156, and 158. Base stations 104 may be or be referred to as "eNodeBs" (eNBs) or "gNodeBs" (gNBs). Each one of base stations 104 provides a cell for device coverage; for example, base station 110 provides a cell 120 for device coverage, base station 112 provides a cell 122 for device coverage, and base station 114 provides a cell 124 for device coverage. In some implementations, the mobile network 100 may be a private mobile broadband network, such as a 5G private mobile broadband network (PMB).

Figure 2:
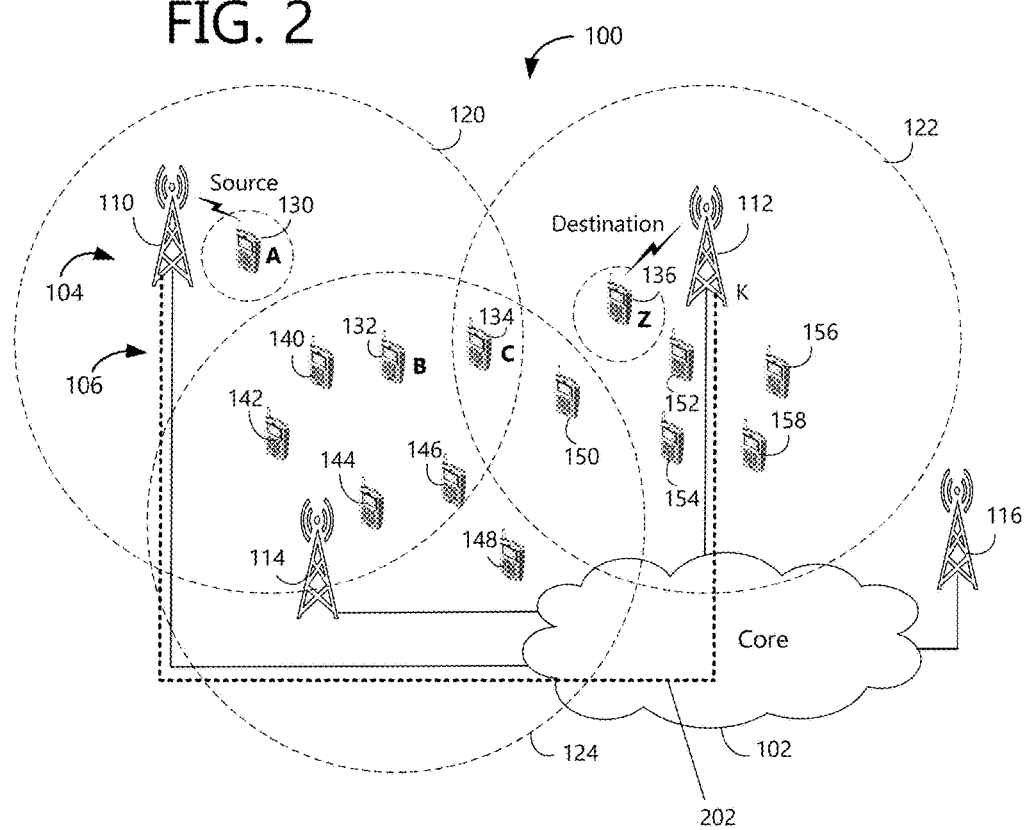
FIG. 2 is an illustrative diagram of the mobile network of FIG. 1, where a connection path between a source UE and a destination UE via the base stations and the core network provides for non-deterministic communications.

FIG. 2 is an illustrative diagram of the mobile network 100 of FIG. 1, where a connection path 202 exists between a source UE (i.e. UE 130/device A) and a destination UE (i.e. UE 136/device B) via the base stations 110, 112 and the core network 102. Note further that the source UE (i.e. UE 130/device A) and the destination UE (i.e. UE 136/device Z) are served by different serving base stations (i.e. UE 130 is served by base station 110, and UE 136 is served by base station 112. Her, communications through the core network 102 will have a relatively high latency and/or will be non-deterministic. For example, in LTE networks, the latency may undesirably be about 20-30 milliseconds.

Figure 3:
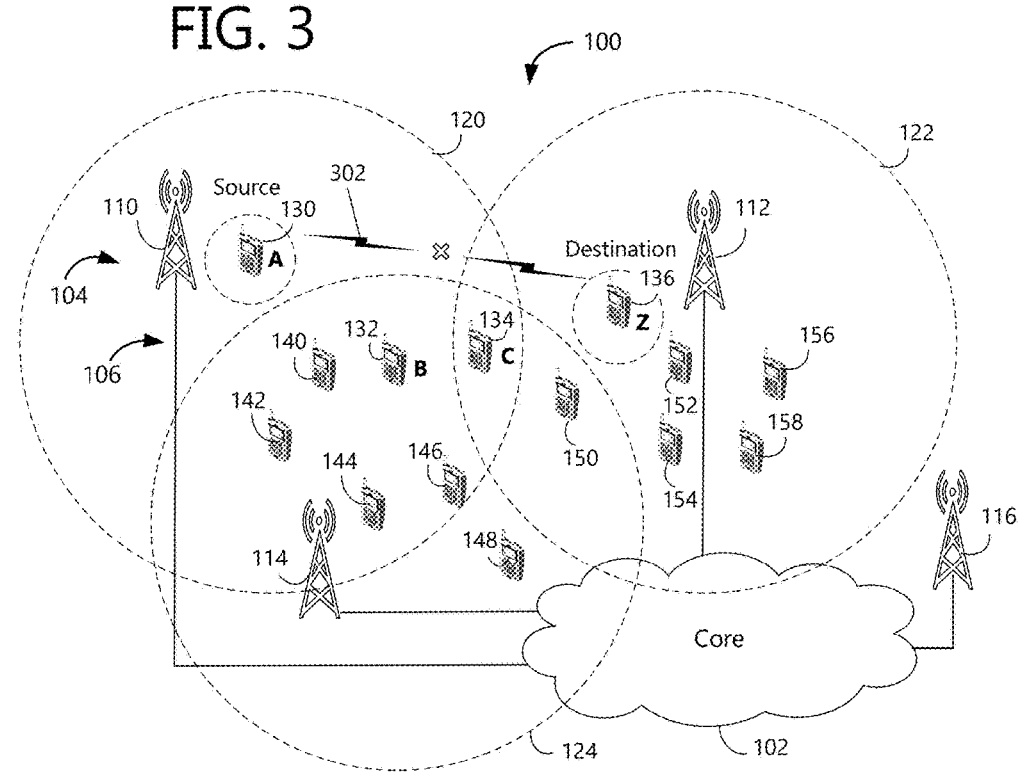
FIG. 3 is an illustrative diagram of the mobile network of FIG. 1, where a direct device-to-device (D2D) connection path between the source UE and the destination UE is not possible or fails to meet requirements (e.g. the source and the destination UEs are out of range of each other)

FIG. 3 is an illustrative diagram of the mobile network 100 of FIG. 1, where a direct device-to-device (D2D) connection path 302 between the source UE (i.e. UE 130/device A) and the destination UE (i.e. UE 136/device Z) is not possible, as the source and the destination UEs are positioned out of proximity and out of range of each other.

Referring ahead now to FIGS. 6A, 6B, and 6C, variations of a basic diagram of a circuit, system, or operational control loop 600 with use of UEs in the mobile network 100 of FIG. 1 are shown. With respect to FIG. 6A, UEs 130, 134, and 136 (i.e. devices A, C, and Z) correspond to "required nodes" of operational control loop 600. In this context, UEs 130, 134, and 136 may be referred to as (industrial) circuit-connected UEs, as each UE 130, 134, and 136 is wired-connected to a circuit component. Such operational control loop 600 may be provided in an industrial setting or application (e.g. factory, manufacturing, processing, or other type of setting or application), where it may be important to provide low latency, deterministic communications.

In the example of FIG. 6A, UE 130 is connected to a sensor 602, UE 134 is connected to a programmable logic controller (PLC) 604, and UE 136 is connected to an actuator. The connections may be wired connections. More particularly, the connections may be tethered (or serial) connections, or alternatively Ethernet wire connections. In some implementations, other industrial devices may be utilized in other control loops for multi-hop D2D communications according to the present disclosure.

During steady-state operation, sensor data from sensor 602 is received at UE 130 (i.e. device A) and transmitted via multi-hop D2D communications to UE 134 (i.e. device C) (process step 1 of FIG. 6A). UE 134 provides the sensor data to PLC 604, which processes the sensor data for producing a control signal (process step 2 of FIG. 6A). The control signal is transmitted via D2D communications to UE 136 (device Z) (process step 3 of FIG. 6A). UE 136 provides the control signal to the actuator 606 which is controlled based on the control signal (process step 4 of FIG. 6A). As is apparent, in this context, it may be appropriate that operational control loop 600 be provided with low latency, deterministic communications.

Figure 4:
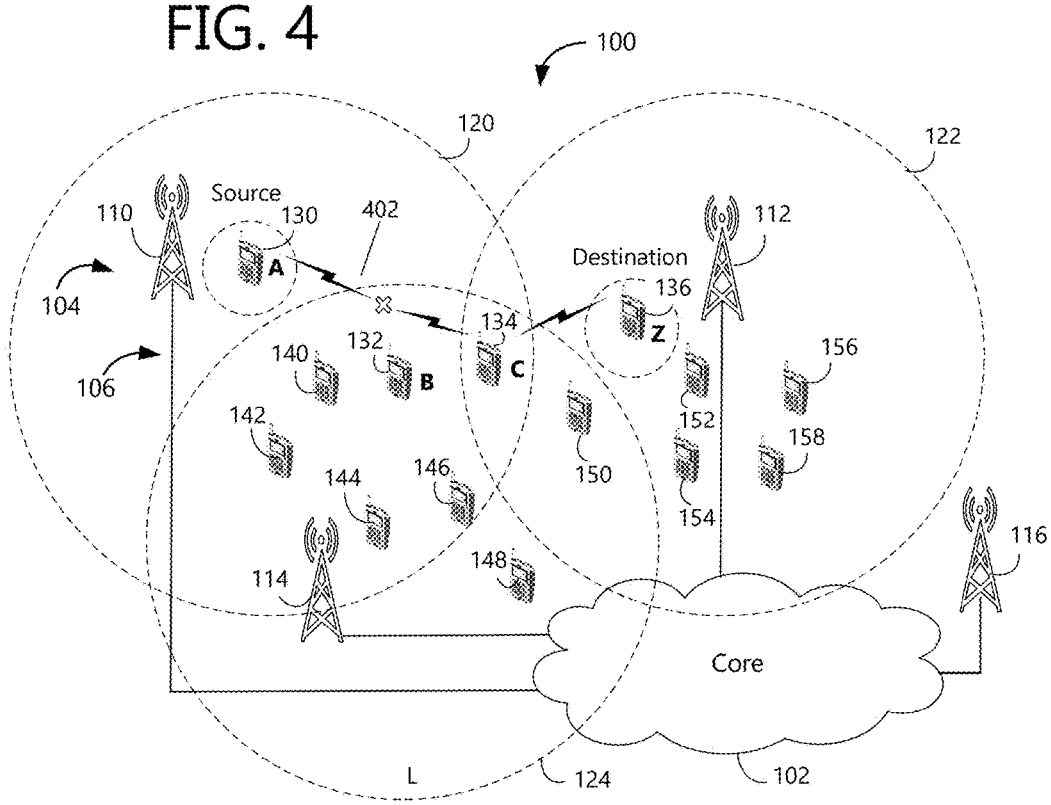
FIG. 4 is an illustrative diagram of the mobile network of FIG. 1, where a D2D connection path between the source UE and the destination UE is not possible or fails to meet requirements (e.g. the source and intermediary UEs are out of range or other requirement is not met)

Note that some of the UEs corresponding to required nodes in the operational control loop 600 may not be able to perform D2D communications with each other, as in the case where the UEs are spaced relatively far apart and out of range from each other, or other requirement is not met. This situation is depicted in FIG. 6B, as well as FIG. 4, where data cannot be properly communicated in a communication 402 in accordance with requirements for the operational control loop 600 or otherwise. In this case, one or more UEs corresponding to "candidate relay nodes" may be utilized to correct the situation. A corrected situation is depicted in FIG. 6C, as well as FIG. 5, where UE 132 corresponding to a candidate relay node is utilized in a selected connection path 502 for the operational control loop 600. UE 132 corresponding to a candidate relay node may be referred to as an intermediary UE.

During steady-state operation of the operational control loop 600 of FIG. 6C, sensor data from sensor 602 is received at UE 130 (i.e. device A) and transmitted via D2D communications to UE 132 (i.e. device B) (process step 1 of FIG. 6C). UE 132 relays the sensor data to UE 134 (i.e. device C) (process step 2 of FIG. 6C). UE 134 receives the relayed sensor data and provides it to PLC 604, which processes the sensor data for producing a control signal (process step 3 of FIG. 6C). The control signal is transmitted via D2D communications to UE 136 (i.e. device Z) (process step 4 of FIG. 6C). UE 136 provides the control signal to the actuator 606 which is controlled based on the control signal (process step 5 of FIG. 6C). As is apparent, in this context, it may be important that operational control loop 600 of FIG. 6C be provided with low latency, deterministic communications.

FIG. 7 is a flowchart 700 for describing an overview of a method for providing multi-hop D2D communications in a D2D mesh network. Beginning at a start block 702 of FIG. 7, a network-based D2D path selection procedure for selecting a connection path for the D2D mesh network may be performed (step 704 of FIG. 7). The selected connection path may include UEs indicated as required nodes and at least one UE indicated as a candidate relay node. The path selection procedure of step 704 may be performed by one or more controllers, where a controller may be or include a path computation entity (PCE). The path selection procedure of step 704 may be performed by the method of FIG. 9, with or without the various techniques and implementations described in relation to the other figures.

After the path selection procedure is performed, multi-hop D2D communications between the UEs in the selected connection path may be performed (step 706 of FIG. 7). The D2D communications in the selected connection path may provide for low latency, deterministic communications. Data communications characterized as deterministic may be said to be those communications received with (e.g. at least a stringent, measurable) certainty according to a timing that is known in advance. Such communications may be especially suitable for industrial applications (see e.g. FIGS. 6A, 6B, and 6C).

Figure 5:
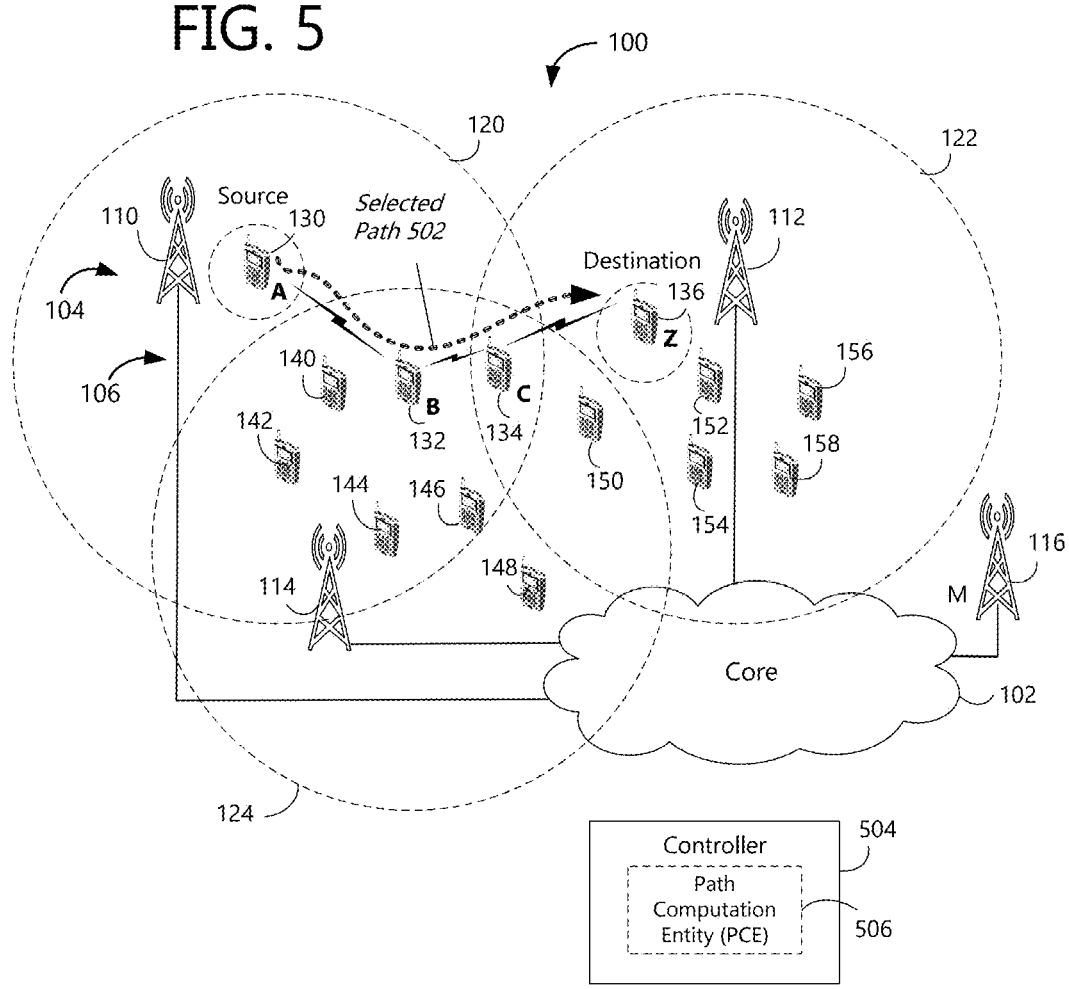
FIG. 5 is an illustrative diagram of the mobile network of FIG. 1, where a selected connection path is established between the source and the destination UEs for D2D communications in a D2D mesh network according to some implementations of the present disclosure.

FIG. 8 is a flowchart 800 for describing a method for use in performing a path selection procedure according to some implementations. The method of FIG. 8 may be employed together with the method of FIG. 9 described below. The method of FIG. 8 may be embodied in or as a controller, a server, a component, or other device of a mobile network (see e.g. FIG. 5 showing a controller 504 which is or includes a path selection module 506). The method may also be embodied as a computer program product including a non-transitory computer readable medium and instructions (e.g. a PCE or a path selection module) stored in the non-transitory computer readable medium, where the instructions are executable on one or more processors of the controller for performing the steps of the method.

Beginning at a start block 802 of FIG. 8, a first set of identifiers of UEs indicated as "required nodes" for a D2D mesh network may be received or obtained (step 804 of FIG. 8). All of these required nodes may be included in a connection path to be selected for D2D communications. In some implementations, the number of required nodes is two (2) or more. In some preferred implementations, the number of required nodes is three (3) or more (see e.g. FIGS. 6A, 6B, and 6C).

Next in FIG. 8, a second set of identifiers of UEs indicated as "candidate relay nodes" for the D2D mesh network may be received or obtained (step 806 of FIG. 8). In preferred implementations, the number of candidate relay nodes is two (2) or more. At least one of these candidate relay nodes may be included in the connection path to be selected for D2D communications (e.g. for bridging a coverage gap or for satisfying an otherwise unmet requirement). A connector A of FIG. 8 connects the flowchart 800 with the flowchart 900 of FIG. 9.

In some implementations of FIG. 8, an application ("app") for path selection is provided in one of the UEs of the mobile network. Here, the application receives a user selection of the set of UEs indicated as required nodes (for step 802) and a user selection of the set of UEs indicated as candidate relay nodes (for step 804). The user selection of UEs may be performed via a user interface of the UE, through text entry or key/touch selection.

FIG. 9 is a flowchart 900 for describing a method for use in performing a path selection procedure according to some implementations. The method of FIG. 9 may be employed together with the method of FIG. 8 described above. In addition, or alternatively, the method of FIG. 9 may be employed together with the method of FIGS. 10A-10B described below. The method of FIG. 9 may be embodied in or as a controller, a server, a component, or other device of a mobile network (see e.g. FIG. 5 showing a controller 504 which is or includes a path selection module 506). The method may also be embodied as a computer program product including a non-transitory computer readable medium and instructions (e.g. a PCE or a path selection module) stored in the non-transitory computer readable medium, where the instructions are executable on one or more processors of the controller for performing the steps of the method.

Figure 14:
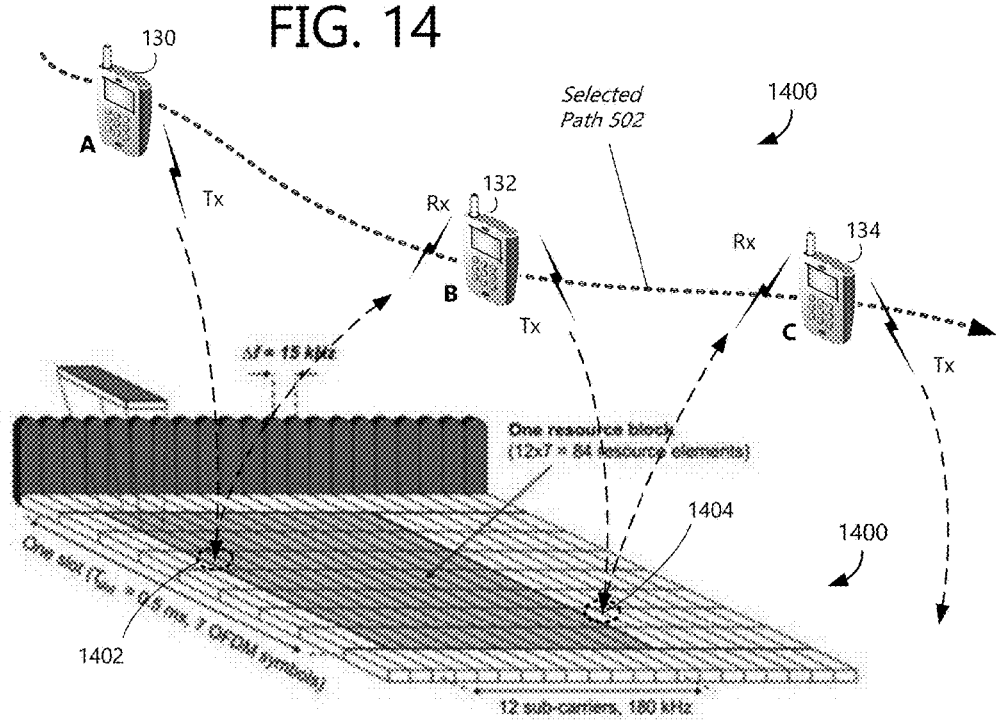
FIG. 14 is an illustrative representation of a D2D communication showing an allocation of a plurality of resource blocks (RBs) of the mobile network for multi-hop D2D communications between UEs in the selected connection path.

Beginning at a start block 902 of FIG. 9, a plurality of base stations (e.g. eNodeBs or gNodeBs) of the mobile network may be synchronized in time (step 904 of FIG. 9). The synchronization of base stations may be performed, for example, with use of Global Position System (GPS) timing technology or a Precision Time Protocol (PTP) (IEEE 1588/802.1AS). Synchronization of the base stations is performed in order to time align resource blocks (RBs) of each base station (see e.g. FIG. 14), as the source and destination UEs (and/or other intermediary UEs) may be served by different base stations.

Identifiers of candidate D2D device pairings from D2D peer discovery performed by a plurality of UEs served in a plurality of base stations and link quality data associated with each candidate D2D device pairings may be obtained (step 906 of FIG. 9). The identifiers of the UEs may be received directly or inferred from a communication schedule. In some implementations, beacon resources may be assigned and broadcasted to UEs in the mobile network prior to and/or for the D2D device discovery. Step 906 may be performed at least in part using the method of FIGS. 11 and 12 described later below.

D2D network topology map data comprising a plurality of link-state relationships may be generated based on the identifiers of candidate D2D device pairings (step 908 of FIG. 9). In general, the D2D network topology map data may describe an "inter-cell" D2D network topology map. "Link-state" refers to link-state routing protocols, where states of links may be synchronized amongst participating nodes (e.g. base stations). The generated link-state relationships may be similar to or the same as those of a link state database (LSDB).

Figure 13:
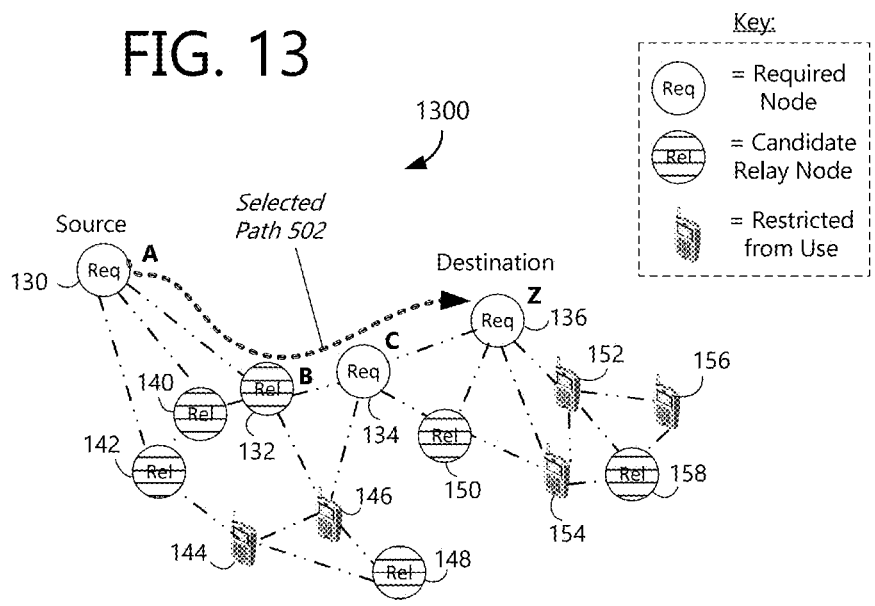
FIG. 13 is a graphical or pictorial representation of a D2D network topology map including a plurality of UE-link relationships between UEs in the mobile network according to some implementations of the present disclosure.

An example graphical or pictorial representation of a D2D network topology map 1300 for the mobile network of FIGS. 1-5 is illustrated in FIG. 13. Connection lines between circle indicators represent the candidate device-link relationships (or link-state relationships) between UEs. A key is provided for the circle indicators to reveal which UEs are required nodes ("Req) and which UEs are candidate relay nodes ("Rel"). Note that required nodes and candidate relay nodes may remain in fixed position during operation (e.g. being part of the operational control loop of FIGS. 6A, 6B, and 6C).

Referring back to FIG. 9, a plurality of connection paths of UEs may be computed based on the generated link-state relationships and the link quality data (step 910 of FIG. 9). Each computed connection path may include UEs indicated as required nodes including a source node and a destination node. In addition, each computed connection path may include at least one UE indicated as a candidate relay node. Viewing connector A in FIG. 9, the set of identifiers of UEs indicated as required nodes and the set of UEs indicated as candidate relay nodes may be received or obtained as described in the method of FIG. 8 (i.e. steps 804 and 806 of FIG. 8).

Next, an optimal path that satisfies a latency parameter or requirement may be selected from the plurality of computed connection paths (step 912 of FIG. 9). In some implementations, connection paths are computed for selection of an optimal path based on a routing algorithm, such as a shortest path first (SPF) algorithm. The SPF algorithm is based on Dijkstra's algorithm which is suitable for calculating the shortest connection path (i.e. the least costly path, where cost may be in terms of latency, link signal quality, link bandwidth, or other metric or combination of metrics).

In some preferred implementations, connection paths are computed for selection of an optimal path based on a constrained SPF, which takes loading into consideration. Thus, a connection path may be selected as an optimal path based on both latency between UEs and loading of the UEs (e.g. for load balancing of UEs, or considering a maximum loading of a given UE). In some other implementations, a connection path that satisfies both the latency requirement and a reliability factor for providing reliable end-to-end (i.e. source to destination) communications may be selected as an optimal path. For example, an additional hop (i.e. an additional UE indicated as a candidate relay node) may be included by the controller in a selected connection path to improve communication reliability at the expense of latency, so long as the latency requirement is satisfied.

In some implementations of steps 910 and 912, a connection path that satisfies a plurality of QoS parameters including the latency parameter may be selected as an optimal path. This approach is described later in relation to FIGS. 10A-10B.

In FIG. 9, one or more resource blocks (RBs) for the UEs in the selected connection path may be selected or allocated (step 914 of FIG. 9). Each RB may correspond to one of a plurality of frequency-time slot tuples that the mobile network otherwise utilizes for communications. See e.g. a plurality of RBs 1400 of FIG. 14. Periodic communication between the UEs along the selected connection path may be scheduled with the UEs (step 916 of FIG. 9). The RBs may be allocated and scheduled (e.g. allocated & scheduled RBs 1402 and 1404 in FIG. 14) so as to provide a repeated, periodic (deterministic) communication. Scheduling for the communication of data packets may be provided in accordance with a suitable protocol, for example, a Generalized Multi-Protocol Label Switching (GMPLS) protocol. Referring again to the allocated RBs 1402 and 1404 of FIG. 14, UE 130 transmits data in an allocated RB 1402 which is received by UE 132; UE 132 transmits its data in an allocated RB 1404 which is received by UE 134; UE 134 transmits its data; and so on. The flowchart 900 ends at an end block 918 of FIG. 9.

In some implementations, the D2D mesh network may be part of an operational control loop having low latency, deterministic D2D communications for an industrial application. See e.g. a selected connection path 502 in FIG. 5 as well as in FIG. 6C, where it is shown that a time period for each hop may be on the order of about 1 millisecond, or perhaps up to 3-4 milliseconds in the case where PLC processing is needed.

Figure 10A:
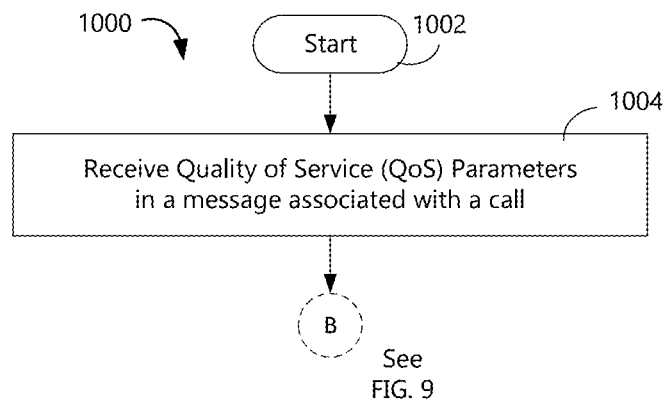
FIG. 10A is a flowchart for describing a method for use in selecting a connection path for multi-hop D2D communications for use in combination with the method of FIG. 9.
Figure 10B:
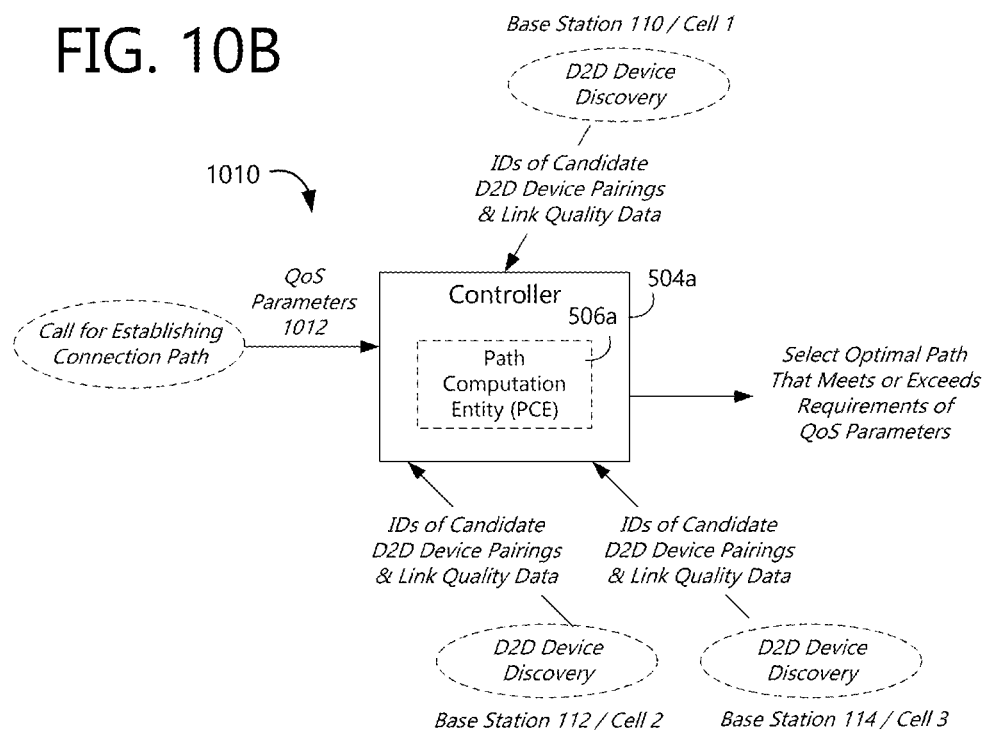
FIG. 10B is an illustrative diagram associated with the method of FIG. 10A.

As described above in relation to FIG. 9, in some implementations of steps 910 and 912, a connection path that satisfies a plurality of QoS parameters may be selected as an optimal path. FIG. 10A is a flowchart 1000 for describing a method for use in selecting a connection path for multi-hop D2D communications using QoS parameters. FIG. 10B is an illustrative diagram 1010 of communications associated with the controller/PCE in the method of FIG. 10A.

Beginning at a start block 1002 of FIG. 10A, a plurality of QoS parameters are received (step 1004 of FIG. 10A). The plurality of QoS parameters may include a latency parameter. The plurality of QoS parameters may be received in a message associated with a call for establishing the D2D connection path. See e.g. FIG. 10B which indicates QoS parameters 1012 received in a message associated with a call. The QoS parameters (e.g. bandwidth, bitrate, latency, and jitter parameters) are used for the selection of an optimal connection path, where an optimal connection path meets the requirements specified by the QoS parameters.

In preferred implementations, the QoS parameters include the following:
QoS-Information::=<AVP Header: 1016>
[QoS-Class-Identifier]
[Max-Requested-Bandwidth]
[Guaranteed-Bit rate]
[Guaranteed-Maximum-Latency]
[Guaranteed-Worst-Case-Jitter]

In some alternative implementations, a combination of one or more of the above QoS parameters may be utilized. The flowchart of FIG. 10A continues through a connection B of FIG. 10A, for continuation of the method in relation to FIG. 9 for selection of the optimal path as described.

In some implementations, one or more UEs may be instructed to adjust one or more communication parameters in order to satisfy one or more of the QoS requirements. For example, one or more UEs may be instructed by the controller to increase an error correction parameter (e.g. forward error correction or FEC). In some other implementations, the controller operates to select two or more parallel, redundant connection paths for the D2D communications. Here, one of the connection paths includes at least one different relay node than the other connection path. Once data is successfully received by a UE over a first connection path, the data over a second connection path may be ignored or discarded.

FIG. 11 is a message flow diagram 1100 for use in describing D2D peer discovery in accordance with some implementations. The method of FIG. 11 may be performed in association with step 906 of FIG. 9 described above.

For D2D device discovery, the mobile network may assign and broadcast beacon resources to the UEs (step 1102 of FIG. 11). Here, each UE may be assigned to a unique resource block or, alternatively, each UE may be assigned to the same resource block and share use of the block (e.g. in a round robin fashion). Each UE in the mobile network may transmit a beacon that other UEs will monitor for and report on. A report may include an identifier of the UE transmitting the beacon, an identifier of a serving base station of the UE transmitting the beacon, a channel measurement, and/or other suitable data. To illustrate, UE 130 may transmit a beacon (step 1104 of FIG. 11) that other UEs 132, 134, and 136 may monitor for and report on to the controller 504 (or PCE 506) (steps 1106, 1108, and 1110 of FIG. 11). Further, UE 132 may transmit a beacon (step 1112 of FIG. 11) that UEs 130, 134, and 136 may monitor for and report on to the controller 504 (steps 1114, 1116, and 1118 of FIG. 11). Additional beacon transmission, monitoring, and reporting may be continued for additional UEs as needed.

In some implementations, most or all of the UEs in the mobile network perform D2D peer discovery. In some other implementations, UEs are selected for D2D device discovery based on the set of identifiers of UEs indicated as required nodes and the set of identifiers of UEs indicated as candidate relay nodes. Here, the other remaining UEs in the mobile network may refrain from participating in D2D peer discovery.

As described above in relation to FIG. 11, each one of a plurality of UEs in a mobile network may transmit a beacon that other UEs will monitor for and report on. A report may include an identifier of the UE transmitting the beacon, an identifier of a serving base station of the UE transmitting the beacon, a channel measurement, and/or other suitable data. To further illustrate, FIGS. 12A-12B are illustrative representations of messages which include beacon messages 1202 and 1206 and reporting messages 1204 and 1208 which may be used in the method of FIG. 9 according to some implementations of the present disclosure.

Figure 12A:
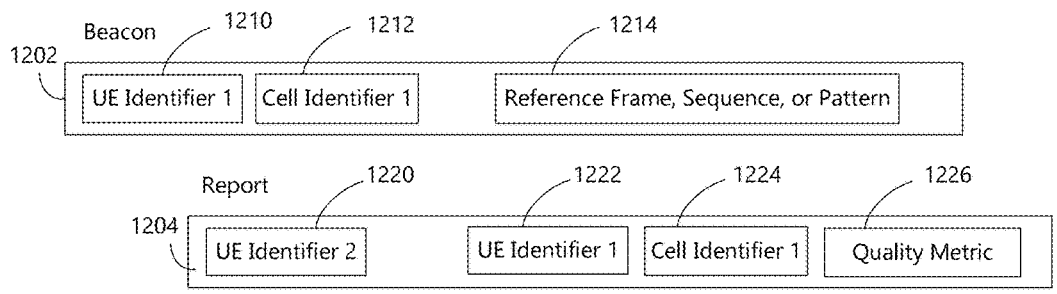
FIGS. 12A-12B are illustrative representations of messages which include beacon messages and reporting messages showing relevant data items therein, for use in the method of FIG. 9 according to some implementations of the present disclosure.

As depicted in FIG. 12A, beacon message 1202 includes a UE identifier 1210 which identifies the UE transmitting the beacon message 1202, a cell identifier 1212 which identifies a serving base station of the UE, and information 1214 comprising a reference frame, sequence, or pattern for use in determining link quality. The information 1214 comprising the reference frame, sequence, or pattern may be known in advance by the UE receiving the beacon message 1202. Reporting message 1204 includes a UE identifier 1220 which identifies the UE transmitting the reporting message 1204, a UE identifier 1222 which identifies the UE that transmitted the beacon message 1202, a cell identifier 1224 which identifies the serving base station of the UE that transmitted the beacon message 1202, and a quality metric 1226 comprising link quality data. The link quality data may be determined by the UE that receives the beacon message 1202 and is based on quality of receipt of the information 1214.

Figure 12B:
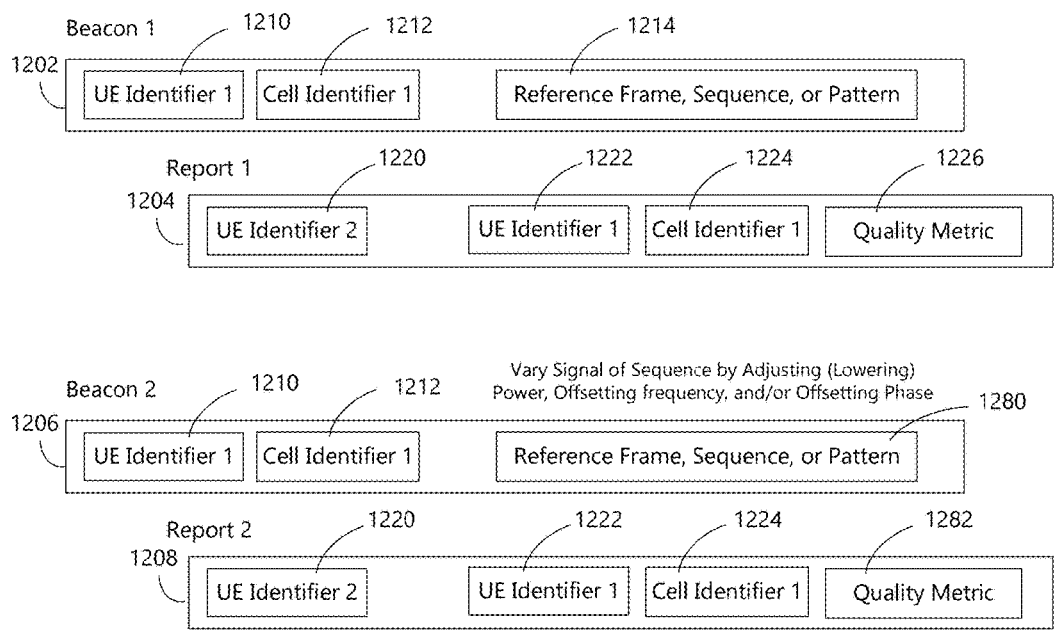

Beacon message 1202 and reporting message 1204 are depicted in FIG. 12B as well, but here the information 1214 comprising the reference frame, sequence, or pattern is transmitted at a first power level. Quality metric 1226 in reporting message 1204 of FIG. 12B may be based on quality of receipt of the information 1214 transmitted at the first power level. One or more additional beacon messages 1206 may be transmitted by the UE, where information 1280 comprising the reference frame, sequence, or pattern is transmitted again but at a second power level (e.g. less than the first power level). Quality metric 1282 in reporting message 1208 of FIG. 12B may be based on quality of receipt of the information 1280 transmitted at the second power level. Thus, the determined link quality data may be based on quality of receipt a gradually-degrading (or more generally, gradually-adjusted) signal which carries one or more predetermined sequences or patterns in one or more beacons. The information may alternatively or additionally be adjusted to offset the frequency and/or phase of the signal carrying the beacons.

Figure 15:
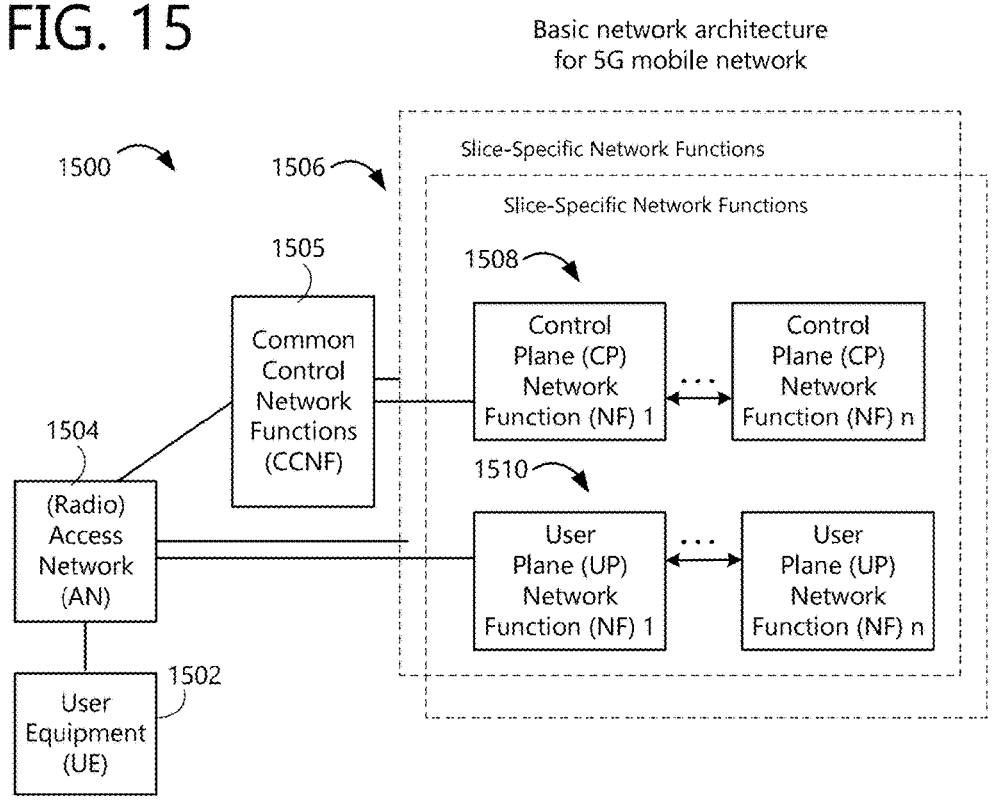
FIG. 15 is an illustrative diagram of a basic network architecture of a 5G mobile network in which techniques of the present disclosure may be implemented.

FIG. 15 is an illustration of a basic network architecture 1500 of a 5G mobile network in which above-described techniques of the present disclosure may be implemented. The 5G mobile network is configured to support network slicing. In general, network architecture 1500 includes common control network functions (CCNF) 1505 and a plurality of slice-specific network functions 1506. One or more UEs 1502 may obtain access to the mobile network via an access network (AN) 1504, which may be a radio access network (RAN).

CCNF 1505 includes a plurality of network functions (NFs) which commonly support all sessions for UE 1502. UE 1502 may be connected to and served by a single CCNF 1505 at a time, although multiple sessions of UE 1502 may be served by different slice-specific network functions 1506. CCNF 1505 may include, for example, an access and mobility management function (AMF) and a network slice selection function (NSSF). UE-level mobility management, authentication, and network slice instance selection are examples of common functionalities provided by CCNF 1505.

Slice-specific network functions 1506 of the network slices are separated into control plane (CP) NFs 1508 and user plane (UP) NFs 1510. In general, the user plane carries user traffic while the control plane carries network signaling. CP NFs 1508 are shown in FIG. 15 as CP NF 1 through CP NF n, and UP NFs 1510 are shown in FIG. 15 as UP NF 1 through UP NF n. CP NFs 1508 may include, for example, a session management function (SMF), whereas UP NFs 1510 may include, for example, a user plane function (UPF).

The mobile network deploys a network slice based on a network slice selection assistance information (NSSAI) provided by UE 1502. During an initial attach procedure by UE 1502, the NSSAI is used by RAN 1504 to select the CCNF 1505. The NSSF in CCNF 1505 selects the network slice instance. In general, network slice instance selection may be based on the NSSAI, a data network name (DNN) of the session, subscription data of UE 1502, and other parameters. An attach accept message from the network includes an accepted or allowed NSSAI for UE 1502.

Figure 16:
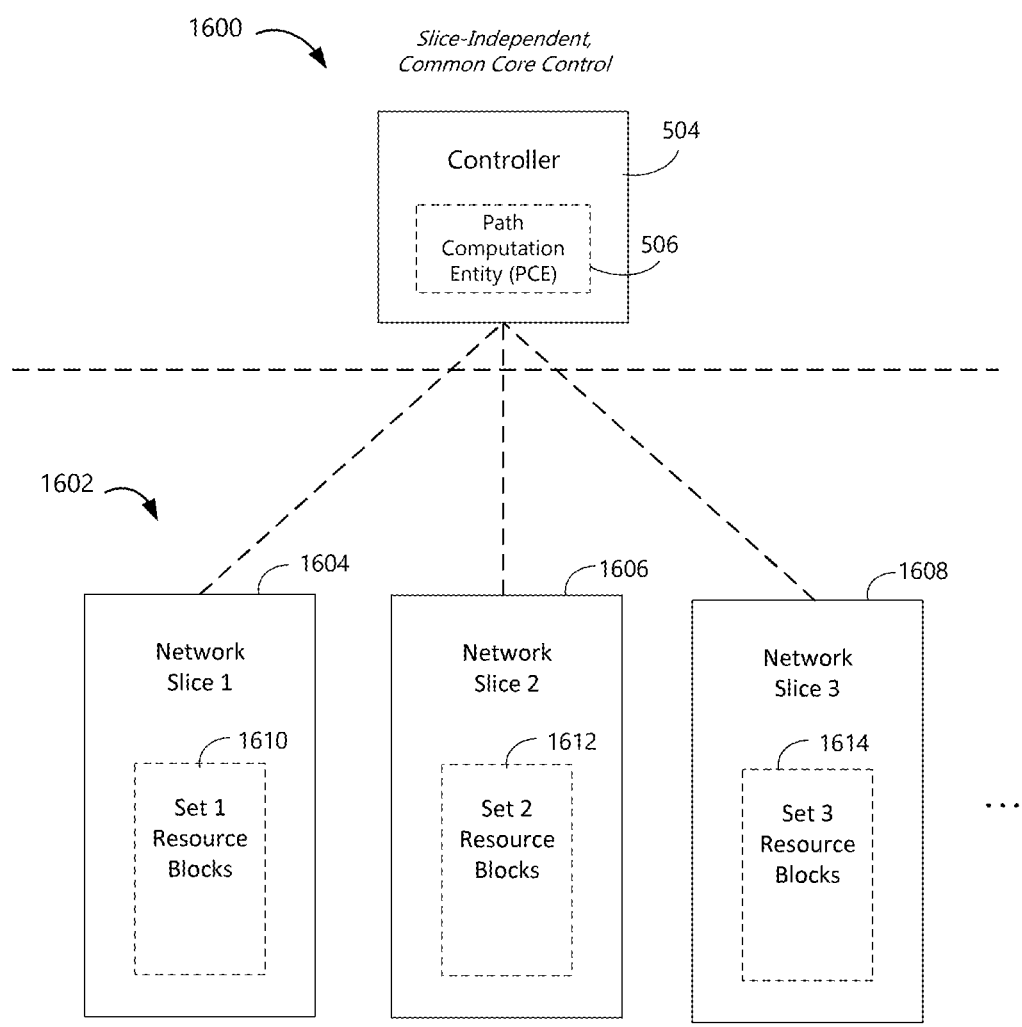
FIG. 16 is an illustrative diagram of a controller/PCE which is a slice-independent controller/PCE of the 5G mobile network according to some implementations.

FIG. 16 is an illustrative diagram 1600 of a "central" or "master" controller 504 (or PCE 506) for use in the 5G mobile network of FIG. 15 in some preferred implementations of the present disclosure, as otherwise described in relation to FIGS. 1-14. A plurality of network slices 1602 of the 5G mobile network are illustrated in FIG. 16. The plurality of network slices 1602 include network slices 1604, 1606, and 1608 which are also designated as Network Slices 1, 2, and 3, respectively. A unique set of resource blocks are allocated to each one of network slices 1604, 1606, and 1608. More particularly, a set of resource blocks 1610 are assigned to network slice 1604, a set of resource blocks 1612 are assigned to network slice 1606, and a set of resource blocks 1608 are assigned to resource blocks.

Controller 504 is slice-independent controller/PCE of the 5G mobile network. Being slice-independent, controller 504 has access to information regarding which UEs are associated with which one of network slices 1604, 1606, and 1608, and therefore, which set of resource blocks 1610, 1612, and 1614 are associated with which UEs. During the path selection procedure and resource allocation, controller 504 may select from and allocate resources blocks from the appropriate set of resource blocks 1610, 1612, and 1614 associated with the UEs based on this information.

Figure 17:
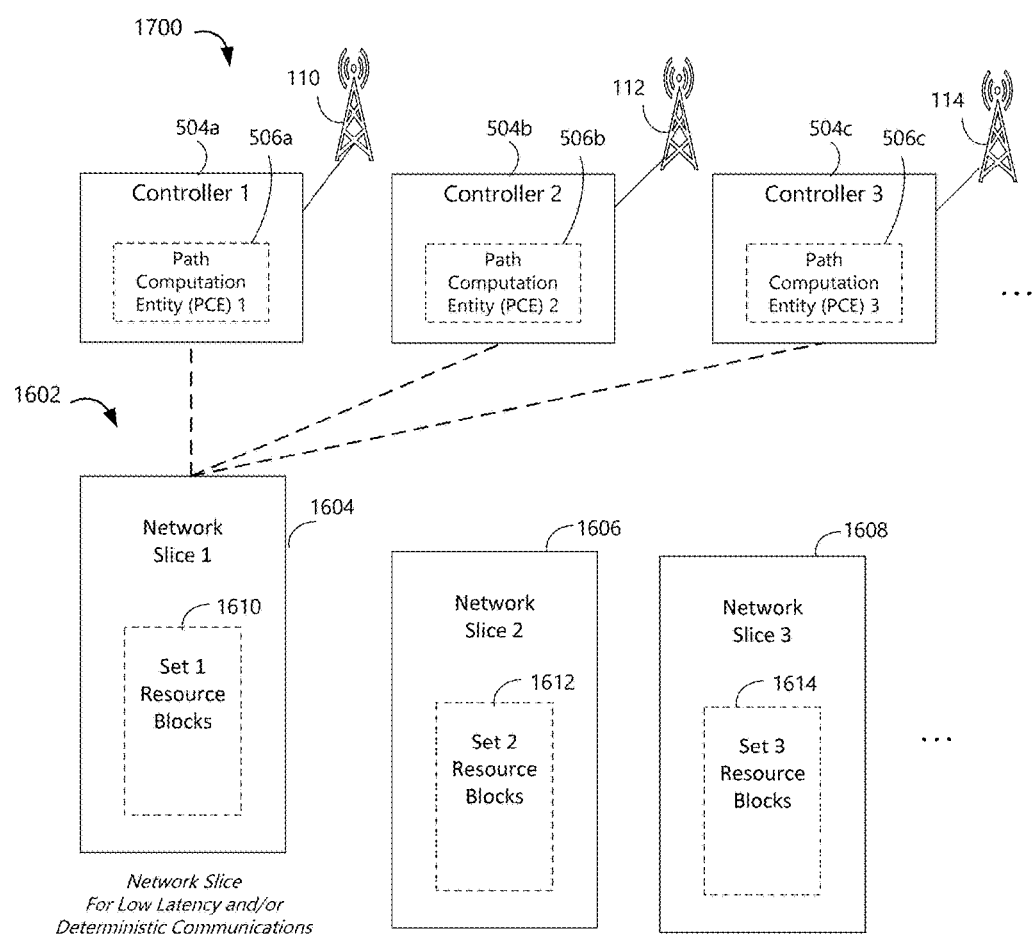
FIG. 17 is an illustrative diagram of a plurality of controllers/PCEs for a network slice associated with low latency and/or deterministic communications of the 5G mobile network according to some implementations.

FIG. 17 is an illustrative diagram 1600 of a plurality of controllers 504a, 504b, and 504c (or PCEs 506a, 506b, and 506c) associated with network slice 1604 for some implementations of the present disclosure, as otherwise described in relation to FIGS. 1-14. Network slice 1604 may be designated for low latency and/or deterministic communications, either exclusively or non-exclusively. In some implementations, the network slice 1604 is designated exclusive for low latency and/or deterministic communications. Controllers 504a, 504b, and 504c may be said to be slice-specific controllers. As shown in FIG. 17, controller 504a is associated with base station 110, controller 504b is associated with base station 112, and controller 504c is associated with base station 114.

When a connection path is established, one of controllers 504a, 504b, 504c may be selected for performing a path selection procedure for D2D communications. In some implementations, one of controllers 504a, 504b, and 504c may be selected based on a location (e.g. serving base station or cell) of the source UE. Selected controller 504a may operate in cooperation with the other controllers 504b and 504c.

As depicted in an illustrative diagram 1800 of FIG. 18A, when controller 504a is selected for performing the path selection procedure, controller 504a may receive identifiers of candidate D2D device pairings from D2D peer discovery and associated data from other controllers 504b and 504c. Here, controller 504a may merge and/or join the information for generating D2D network topology map data comprising the plurality of link-state relationships (e.g. in step 908 of FIG. 9).

Figure 18B:
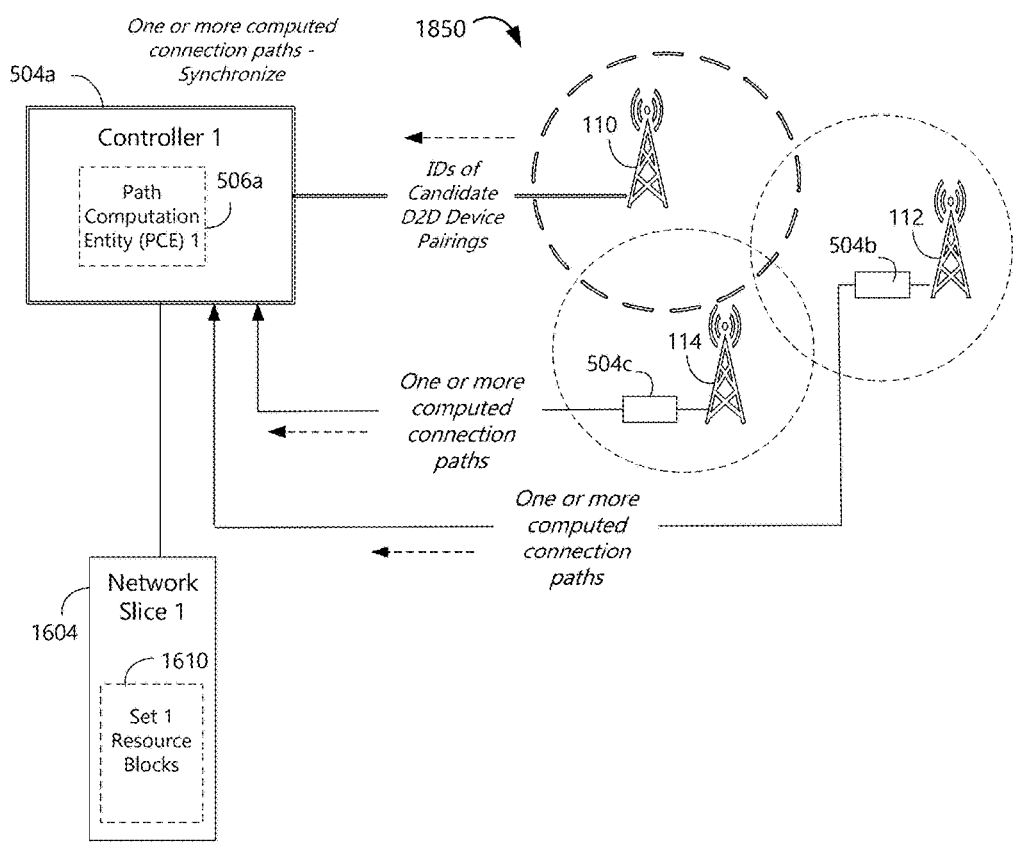
FIG. 18B is an illustrative diagram of one of the controllers/PCEs of FIG. 17 operating in cooperation with other controllers/PCEs according to some implementations.

Alternatively, as depicted in an illustrative diagram 1850 of FIG. 18B, controller 504a may receive one or more computed connection paths or LSDBs from other controllers 504b and 504 for synchronization. Here, controller 504a may synchronize, merge, and/or join the information (e.g. LSDBs), performing any final computation and/or selection of an optimal path based on the information (e.g. step 910 and/or 912 of FIG. 9).

FIG. 19 is a flowchart 1900 of a method for use in selecting a connection path for multi-hop D2D communications with use of the controller architecture of FIGS. 17 and/or 18A-18B. In some implementations, the method of FIG. 19 is provided in method of FIG. 9.

In FIG. 19, a selected controller (or PCE) associated with a base station (e.g. serving the source UE) operates in cooperation with other controllers (or PCEs) associated with other base stations. Beginning at a start block 1902 of FIG. 19, a connection path may be computed or selected for consideration (step 1904 of FIG. 19). The controller may send path information associated with the connection path to one or more other controllers (step 1906 of FIG. 19). The controller may send this path information in a two-phase commit procedure. If an abort or reject message is received in response to the message (step 1908 in FIG. 9), then a next, alternative connection path is computed or selected for consideration (again in step 1904 of FIG. 19). If a commit or accept message is received in response to the message at step 1908, then the D2D communications will be provided with use of the selected connection path.

Figure 20:
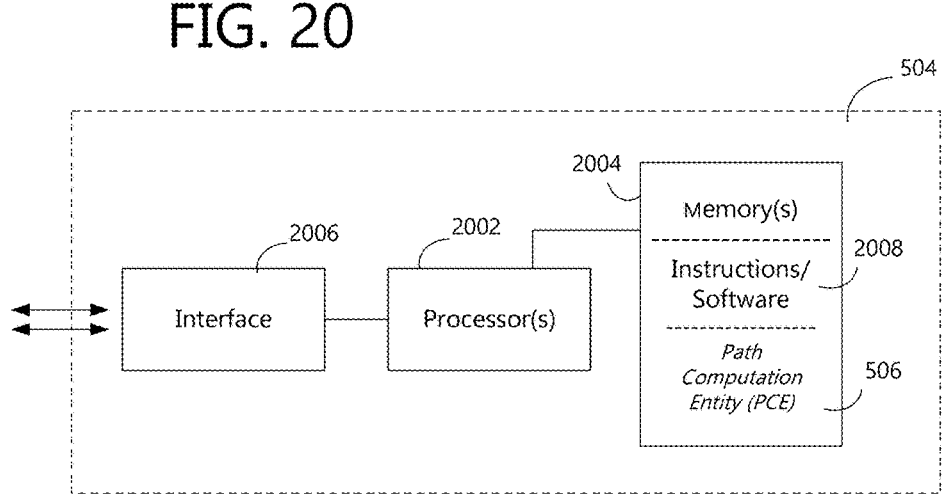
FIG. 20 is a schematic block diagram of a controller or other suitable equipment for use in some implementations of the present disclosure.

FIG. 20 is a schematic block diagram of a controller (e.g. controller 504 of FIG. 5 or other suitable equipment or device) for use in some implementations of the present disclosure. Controller 504 of FIG. 20 may be a controller associated with a base station. Controller 504 of FIG. 20 has components which may include one or more processors 2002 which are coupled to memory 2004 and to an interface 2006. Interface 2006 may be configured to connect to one or more networks for communication. The one or more processors 2002 of are configured to operate according to instructions 2008 stored in memory 2004, in order to perform basic operations as well as to perform additional techniques of the present disclosure (e.g. techniques described in relation to FIGS. 1-19. Instructions 2008 may embody PCE 506 of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first UE could be termed a second UE, and, similarly, a second UE could be termed a first UE, which changing the meaning of the description, so long as all occurrences of the "first UE" are renamed consistently and all occurrences of the second UE are renamed consistently. The first UE and the second UE are both UEs, but they are not the same UE.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:
1. A method comprising:
 at one or more controllers of a mobile network, performing a path selection procedure for selecting a connection path for multi-hop device-to-device (D2D) communications by:
  obtaining identifiers of candidate D2D device pairings from D2D peer discovery performed by a plurality of UEs served in a plurality of base stations and link quality data associated with each candidate D2D device pairing;
  generating a D2D network topology map comprising a plurality of link-state relationships based on the identifiers of the candidate D2D device pairings, wherein the D2D network topology map indicates D2D devices that are required to form the connection path;

computing one or more connection paths of UEs based on the generated link-state relationships and the link quality data; and selecting, from the one or more computed connection paths, an optimal connection path of UEs that satisfies a latency parameter, wherein the optimal connection path includes the D2D devices indicated by the D2D network topology map as being required to form the connection path.

2. The method of claim 1, wherein the selected connection path is part of an operational control loop having deterministic D2D communications.

3. The method of claim 1, wherein computing and selecting the optimal connection path further comprises computing and selecting the optimal connection path based on a Shortest Path First (SPF) or constrained SPF algorithm.

4. The method of claim 1, further comprising:
causing the plurality of base stations which serve the plurality of UEs to be synchronized.

5. The method of claim 1, further comprising:
allocating and scheduling one or more resource blocks (RBs) for the UEs in the selected connection path.

6. The method of claim 5, wherein the scheduling comprises scheduling for transmission of data packets according to Generalized Multi-Protocol Label Switching (GMPLS).

7. The method of claim 1, further comprising:
wherein the one or more computed connection paths includes UEs indicated in a first set of required nodes including a source node and a destination node, and at least one UE indicated in a second set of candidate relay nodes.

8. The method of claim 1, further comprising:
receiving a plurality of quality of service (QoS) parameters which include the latency parameter.

9. The method of claim 8, wherein the plurality of QoS parameters further include at least one of a bandwidth parameter, a bitrate parameter, and a jitter parameter.

10. The method of claim 1, wherein the link quality data is based on quality of receipt of a predetermined sequence or pattern in a beacon.

11. The method of claim 1, wherein the link quality data is based on quality of receipt of a gradually degrading signal which carries one or more predetermined sequences or patterns in one or more beacons.

12. The method of claim 1, wherein the controller comprises a first controller associated with a first base station and the identifiers of candidate D2D device pairings comprise first identifiers of first candidate D2D device pairings, the method further comprising:
obtaining, from a second controller associated with a second base station, second identifiers of second candidate D2D device pairings; and
wherein merging or joining the identifiers of candidate D2D device pairings further comprises merging or joining the first and the second identifiers for generating the inter-cell D2D network topology map.

13. The method of claim 1, wherein the mobile network comprises a 5G private mobile broadband network.

14. The method of claim 1, wherein the one or more controllers comprise a single slice-independent controller of a 5G mobile network.

15. A controller including a path computation entity (PCE) operative to:
perform a path selection procedure for selecting a connection path for multi-hop device-to-device (D2D) communications by:
obtaining identifiers of candidate D2D device pairings from D2D peer discovery performed by a plurality of UEs served in a plurality of base stations and link quality data associated with each candidate D2D device pairing;
generating a D2D network topology map comprising a plurality of link-state relationships based on the identifiers of the candidate D2D device pairings, wherein the D2D network topology map indicates D2D devices that are required to form the connection path;
computing one or more connection paths of UEs based on the plurality of link-state relationships and the link quality data; and
selecting, from the one or more computed connection paths, an optimal connection path of UEs that satisfies a latency parameter, wherein the optimal connection path includes the D2D devices indicated by the D2D network topology map as being required to form the connection path.

16. The controller of claim 15, wherein the selected connection path is part of an operational control loop having deterministic D2D communications.

17. The controller of claim 15 which is further operative to:
receive a plurality of quality of service (QoS) parameters which include the latency parameter; and
wherein selecting the connection path is based on selecting the connection path that satisfies the plurality of QoS parameters.

18. The controller of claim 17, wherein the plurality of QoS parameters further comprise a bandwidth parameter, a bitrate parameter, and a jitter parameter.

19. The controller of claim 15, wherein the link quality data is based on quality of receipt of a predetermined sequence or pattern in a beacon.

20. A computer program product comprising:
a non-transitory computer readable medium;
instructions stored in the non-transitory computer readable medium;
wherein the instructions are executable on one or more processors in a mobile network for:
perform a path selection procedure for selecting a connection path for multi-hop device-to-device (D2D) communications by:
obtaining identifiers of candidate D2D device pairings from D2D peer discovery performed by a plurality of UEs served in a plurality of base stations and link quality data associated with each candidate D2D device pairing;
generating a D2D network topology map comprising a plurality of link-state relationships based on the identifiers of the candidate D2D device pairings, wherein the D2D network topology map indicates D2D devices that are required to form the connection path;
computing one or more connection paths of UEs based on the plurality of link-state relationships and the link quality data; and
selecting, from the one or more computed connection paths, an optimal connection path of UEs that satisfies a latency parameter, wherein the optimal connection path includes the D2D devices indicated by the D2D network topology map as being required to form the connection path.

* * * * *